United States Patent [19]
Luetzow

[11] Patent Number: 5,444,369
[45] Date of Patent: Aug. 22, 1995

[54] MAGNETIC ROTATIONAL POSITION SENSOR WITH IMPROVED OUTPUT LINEARITY

[75] Inventor: Robert H. Luetzow, Huntington, Ind.

[73] Assignee: Kearney-National, Inc., White Plains, N.Y.

[21] Appl. No.: 19,231

[22] Filed: Feb. 18, 1993

[51] Int. Cl.$^6$ .......................... G01B 7/30; G01B 7/14; F02D 9/00

[52] U.S. Cl. .................. 324/207.20; 324/207.25; 324/207.12; 123/376

[58] Field of Search ................ 324/173, 174, 207.12, 324/207.2, 207.21, 207.25, 235, 251, 252, 117 H; 338/32 R, 32 H; 307/309; 73/DIG. 3, 518–520; 123/617, 376; 340/671; 341/15; 137/553, 554

[56] References Cited

U.S. PATENT DOCUMENTS

| | | | |
|---|---|---|---|
| 3,162,805 | 12/1964 | Robertson | 324/207.2 X |
| 3,359,492 | 12/1967 | Kuhrt et al. | 324/207.2 X |
| 3,435,332 | 3/1969 | Kurdyla | 324/251 |
| 3,613,021 | 10/1971 | Scheidt | 330/6 |
| 3,708,755 | 1/1973 | Ruehle . | |
| 3,753,139 | 8/1973 | Spencer | 330/110 |
| 3,768,028 | 10/1973 | Wolcott et al. . | |
| 3,777,273 | 12/1973 | Baba et al. | 324/207.25 X |
| 3,835,373 | 9/1974 | Matula | 338/32 H X |
| 3,900,814 | 8/1975 | Masuda | 338/32 R |
| 3,942,045 | 3/1976 | Palazzetti | 324/174 X |
| 4,093,917 | 6/1978 | Haeussermann | 324/173 |
| 4,180,753 | 12/1979 | Cook, II | 324/174 X |
| 4,204,158 | 5/1980 | Ricouard et al. | 324/207.2 |
| 4,327,416 | 4/1982 | Jerrim | 369/481 |
| 4,367,721 | 1/1983 | Boyer | 123/617 |
| 4,371,837 | 2/1983 | Sieverin | 324/225 |
| 4,377,088 | 3/1983 | Evert | 73/640 |
| 4,406,272 | 9/1983 | Kiess et al. | 324/207.2 X |
| 4,471,741 | 9/1984 | Asik et al. | 123/478 |
| 4,518,918 | 6/1985 | Avery | 324/251 X |
| 4,521,727 | 6/1985 | Atherton et al. | 307/309 X |
| 4,570,118 | 2/1986 | Tomczak et al. | 324/251 X |

(List continued on next page.)

FOREIGN PATENT DOCUMENTS 464755 12/1968 Switzerland .

OTHER PUBLICATIONS

G. Lemarquard et al., "Annular Magnetic Position Sensor," *IEEE Transactions on Magnetics*, vol. 26, No. 5, Sep. 1990.

Primary Examiner—Sandra L. O'Shea
Assistant Examiner—Jay M. Patidar
Attorney, Agent, or Firm—Woodard, Emhardt, Naughton, Moriarty & McNett

[57] ABSTRACT

A rotary shaft position sensor includes a stator and a rotor and produces a linear output signal in accordance with the rotational position of a shaft coupled to the rotor. The rotor rotates about an axis of rotation. The stator includes stationary pole pieces having stationary pole faces situated perpendicular to the axis of rotation and spaced a predetermined distance apart to define an air gap therebetween. A Hall effect device is situated-in the air gap. The Hall device produces an output signal corresponding to the level of magnetic flux in the air gap. One or more magnets are attached to the rotating pole piece. The magnetic poles of the magnets are situated parallel with and spaced a predetermined distance from the stationary pole faces. Lines of magnetic flux originating from the magnets are situated in a direction perpendicular to the stationary pole face. The rotating pole piece rotates in close proximity to the stationary pole pieces. As the rotor rotates about the axis of rotation, a portion of the magnet is aligned with the stationary pole faces. Magnetic flux corresponding to the aligned portion of the magnet and the stator pole faces appears in the air gap. A temperature compensation circuit for use with the rotary shaft position sensor includes first and second temperature compensation circuits for counteracting sensitivity temperature drift and zero gauss offset temperature drift characteristics of the Hall effect device.

24 Claims, 18 Drawing Sheets

U.S. PATENT DOCUMENTS

| | | | |
|---|---|---|---|
| 4,620,513 | 11/1986 | Ushida et al. | 123/146.5 |
| 4,646,011 | 2/1987 | Wallrafen | 324/207.25 |
| 4,646,014 | 2/1987 | Eulenberg | 324/251 |
| 4,652,820 | 3/1987 | Maresca | 324/232 X |
| 4,673,827 | 6/1987 | Sommer | 307/116 |
| 4,687,994 | 8/1987 | Fulkerson et al. | 324/251 |
| 4,688,420 | 8/1987 | Minagawa | 73/118.1 |
| 4,700,188 | 10/1987 | James | 340/870.03 |
| 4,703,261 | 10/1987 | Berchtold | 324/207.2 |
| 4,734,594 | 3/1988 | Nelson | 327/511 |
| 4,737,710 | 4/1988 | Van Antwerp et al. | 324/251 X |
| 4,743,786 | 6/1988 | Ichikawa et al. | 324/207.25 X |
| 4,745,811 | 5/1988 | Gray | 73/708 |
| 4,746,859 | 6/1988 | Malik | 324/225 |
| 4,760,285 | 7/1988 | Nelson | 307/309 |
| 4,782,692 | 11/1988 | Peden et al. | 73/117.3 |
| 4,789,826 | 12/1988 | Willett | 324/207.2 |
| 4,810,967 | 3/1989 | Yokoyama et al. | 324/262 X |
| 4,825,157 | 4/1989 | Mikan | 324/251 X |
| 4,829,248 | 5/1989 | Loubier | 307/309 X |
| 4,833,406 | 5/1989 | Foster | 324/225 |
| 4,853,630 | 8/1989 | Houston | 324/207.2 |
| 4,857,842 | 8/1989 | Sturman et al. | 324/225 |
| 4,859,941 | 8/1989 | Higgs et al. | 324/251 X |
| 4,893,027 | 1/1990 | Kammerer et al. | 307/116 |
| 4,893,502 | 1/1990 | Kubota et al. | 324/207.2 X |
| 4,920,939 | 5/1990 | Gale | 123/399 |
| 4,929,993 | 5/1990 | Popovic | 257/424 |
| 4,935,698 | 6/1990 | Kawaji et al. | 324/207.20 |
| 4,966,041 | 10/1990 | Miyazaki | 324/225 X |
| 4,995,364 | 2/1991 | Kamei et al. | 123/442 |
| 5,025,213 | 6/1991 | Dobler et al. | 324/207.25 X |
| 5,055,768 | 10/1991 | Plagens | 323/368 |
| 5,144,234 | 9/1992 | Murata | 324/207.2 X |
| 5,159,268 | 10/1992 | Wu | 324/207.2 |
| 5,164,668 | 11/1992 | Alfors | 324/207.2 |
| 5,270,645 | 12/1993 | Wheeler et al. | 324/207.20 X |
| 5,299,451 | 4/1994 | Brosse | 324/207.2 X |

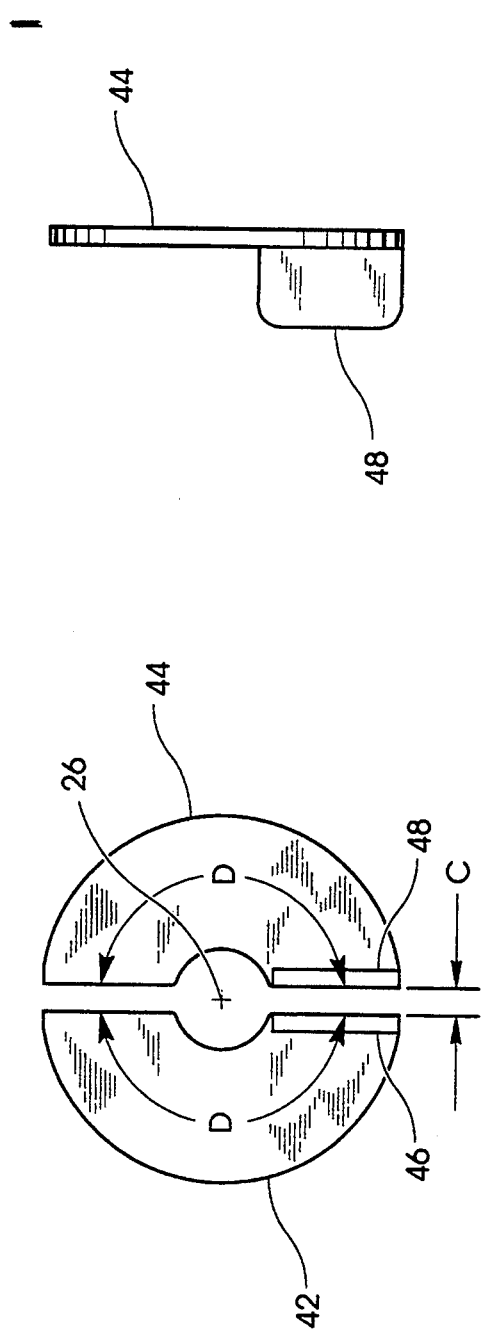

MAGNETIC ROTATIONAL POSITION SENSOR WITH IMPROVED OUTPUT LINEARITY

FIELD OF THE INVENTION

This invention relates to rotary shaft position sensors and more specifically to a sensor that produces a linear output signal in detecting the rotational position of a throttle valve of an internal combustion engine.

BACKGROUND OF THE INVENTION

Electronic fuel injected engines used in motor vehicles typically include a microprocessor based control system. Fuel is metered, or injector activation time is varied, in accordance with various engine parameters detected through sensors. Some of the parameters include engine temperature, mass air flow rate, present vehicle speed, engine RPM, oxygen content in the exhaust, and, most importantly, the position of the butterfly valve or throttle valve that controls air flow into the engine.

Typically the throttle valve rotates from a closed position to an open position in a span of ninety degrees or less. Throttle valve position detection is accomplished by attaching a rotational position sensor to the rotational axis of the throttle valve. The rotational position sensor produces an output voltage signal in accordance with the relative position of the throttle valve. The accuracy and repeatability of the sensor over an extended period of time must not vary significantly. Otherwise, the engine control computer may be required to compensate for drift or variance of the sensor. Software that must compensate for sensor output signal drift can be unduly complex and waste program memory space better used for engine control algorithms. It is preferred that the sensor produce a linear output and that over the life expectancy of the sensor, the output signal versus rotational position vary only an insignificant amount as temperature extremes are encountered.

Installation of a high accuracy sensor in the engine compartment of a motor vehicle is a requirement with regard to the throttle valve sensor. Temperature extremes in the engine compartment typically result in temperature drift of electronic circuits installed therein.

Linear Hall effect devices are simplistic in operation and may be used with non-contact type magnetic coupling rotary sensors to produce a signal corresponding to angular position. A more reliable throttle position sensor that includes non-contact type operation and Hall effect based electronics would satisfy several concerns of automobile manufacturers good signal to noise ratios are achieved and if the temperature drift of the Hall device is compensated through a low component count temperature compensation circuit. Reducing cost and improving long term accuracy and reliability are the foremost concerns in producing a reliable engine compartment sensor.

A rotary sensor that includes improved signal to noise, a linear output signal response, is more economical to produce and is resistant to temperature extremes is needed.

SUMMARY OF THE INVENTION

According to one embodiment of the present invention, a magnetic sensor is provided including Hall effect means for sensing magnetic flux and producing an output signal corresponding to the sensed level of magnetic flux, magnetic means for producing magnetic flux, means for conducting magnetic flux between the magnetic means and the Hall effect means, the means for conducting magnetic flux defining an axis of rotation for the magnetic sensor and including stationary means for conducting magnetic flux across a stationary surface perpendicular to the axis of rotation and rotating means for conducting magnetic flux across a rotating surface perpendicular to the axis of rotation, the stationary surface being spaced a predetermined distance from the rotating surface to define an air gap therebetween, the magnetic means producing magnetic flux parallel to the axis of rotation and perpendicular to the stationary surface and the rotating surface, wherein the rotating means rotates relative to the stationary means to align a portion of the rotating surface with a portion of the stationary surface and conduct a level of magnetic flux corresponding to the aligned portions of the stationary surface and the rotating surface between the magnetic means and the Hall effect means and across the predetermined air gap to complete a magnetic circuit therebetween.

According to another embodiment of the present invention, a magnetic sensor is provided including first and second stationary pole pieces having first and second stationary pole faces, respectively, the first and second stationary pole pieces being spaced a predetermined distance apart to define a first predetermined air gap therebetween, a Hall effect device is situated in the first predetermined air gap, the Hall effect device producing an output signal corresponding to the level of magnetic flux in the first predetermined air gap, a rotating pole piece, the rotating pole piece defining an axis of rotation for the sensor, a first magnet having a first magnet pole face, the first magnet generating magnetic flux in a direction perpendicular to the first magnet pole face and being attached to the rotating pole piece with the first magnet pole face parallel to and spaced a predetermined distance from the first and second stationary pole faces to define a second predetermined air gap, wherein the rotating pole piece rotates relative to the first and second stationary pole pieces about the axis of rotation to align a portion of the first magnet pole face with portions of the first and second stationary pole faces and supply a level of magnetic flux corresponding to the aligned portions of the first magnet pole face and the first and second stationary pole faces into the first predetermined air gap.

One object of the present invention is to provide an improved rotational position sensor.

Another object of the present invention is to provide a rotational sensor that produces a linear output signal in accordance with rotational position of a shaft.

Still another object of the present invention is to provide an inexpensive, yet reliable rotational magnetic sensor.

Yet another object of the present invention is to provide a reliable rotational magnetic sensor that includes a low component count Hall effect circuit to compensate for temperature drift of the Hall effect device.

These and other related objects and advantages of the present invention will become apparent from the following drawings and written description.

BRIEF DESCRIPTION OF THE DRAWINGS

FIG. 5 is a plan view of two 180 degree stationary stator plates of the rotational magnetic sensor of FIGS. 1A and 1B spaced opposite one another to define an air gap therebetween.

FIG. 6 is a side elevational view of the stator plates of FIG. 5.

DESCRIPTION OF THE PREFERRED EMBODIMENT

Figures 1A, 1B:
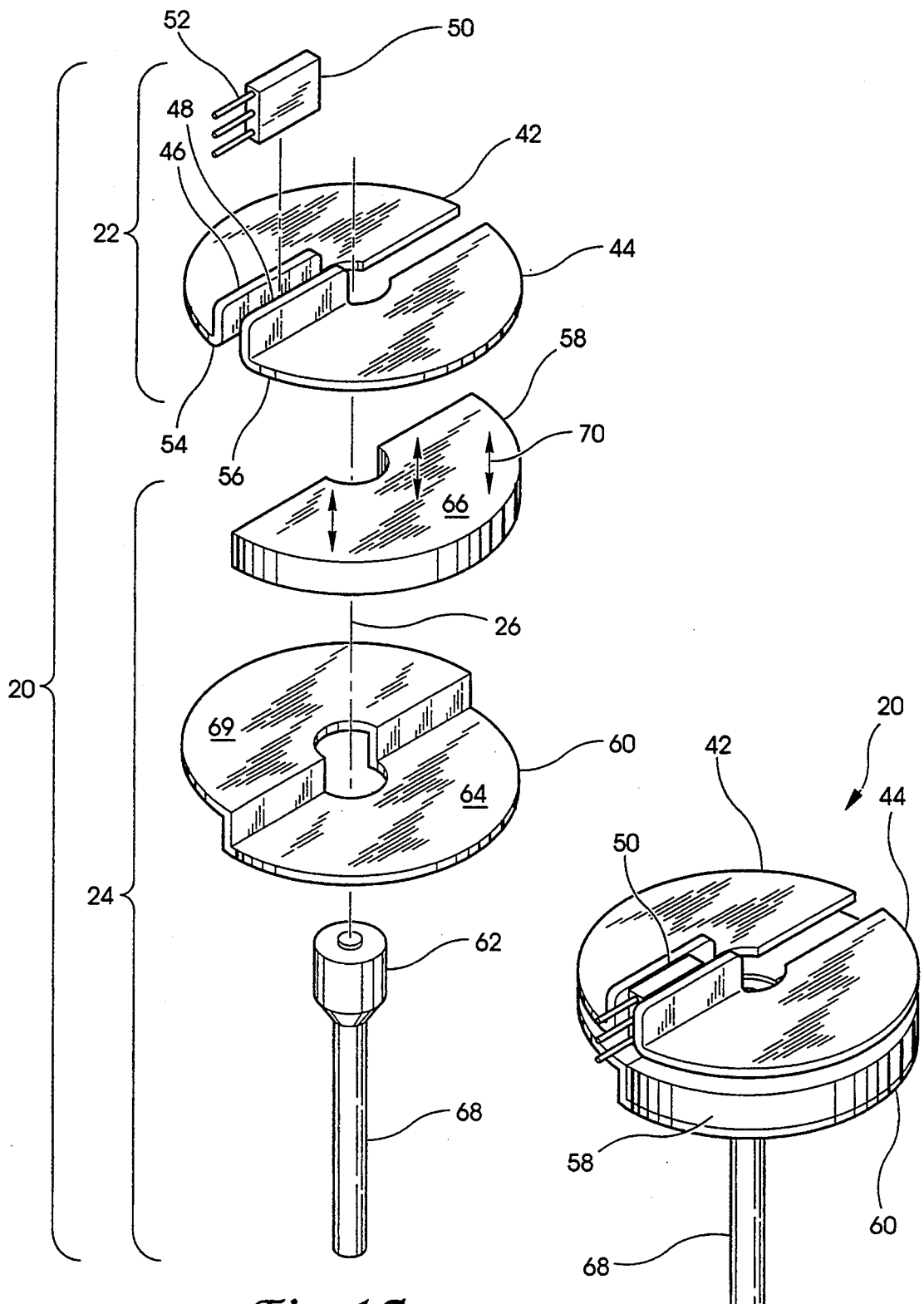
FIG. 1A is an exploded view of a rotational magnetic sensor according to a first embodiment of the present invention.
FIG. 1B is a perspective view of the rotational magnetic sensor of FIG. 1A assembled.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 1A and 1B, a rotational magnetic sensor 20 is shown. The sensor 20 is used for sensing angular position of an object or shaft and producing an output signal corresponding to the sensed angular position. Sensor 20 includes a stator assembly 22 and a rotor assembly 24 aligned on a central axis 26. Magnetic sensor 20 generates a voltage output signal that is a true linear analog representation of the relative angle between stator assembly 22 and rotor assembly 24. Therefore, magnetic sensor 20 is usable as a position sensor without substantive modification of the voltage output signal to provide linear feedback in the detection of, for example, throttle valve rotational position. Unlike prior art magnetic sensors, magnetic sensor 20 includes a magnet that supplies magnetic flux in a direction parallel, rather than perpendicular, to its axis of rotation, thereby resulting in increased magnetic coupling and improved signal to noise ratios.

Figure 2:
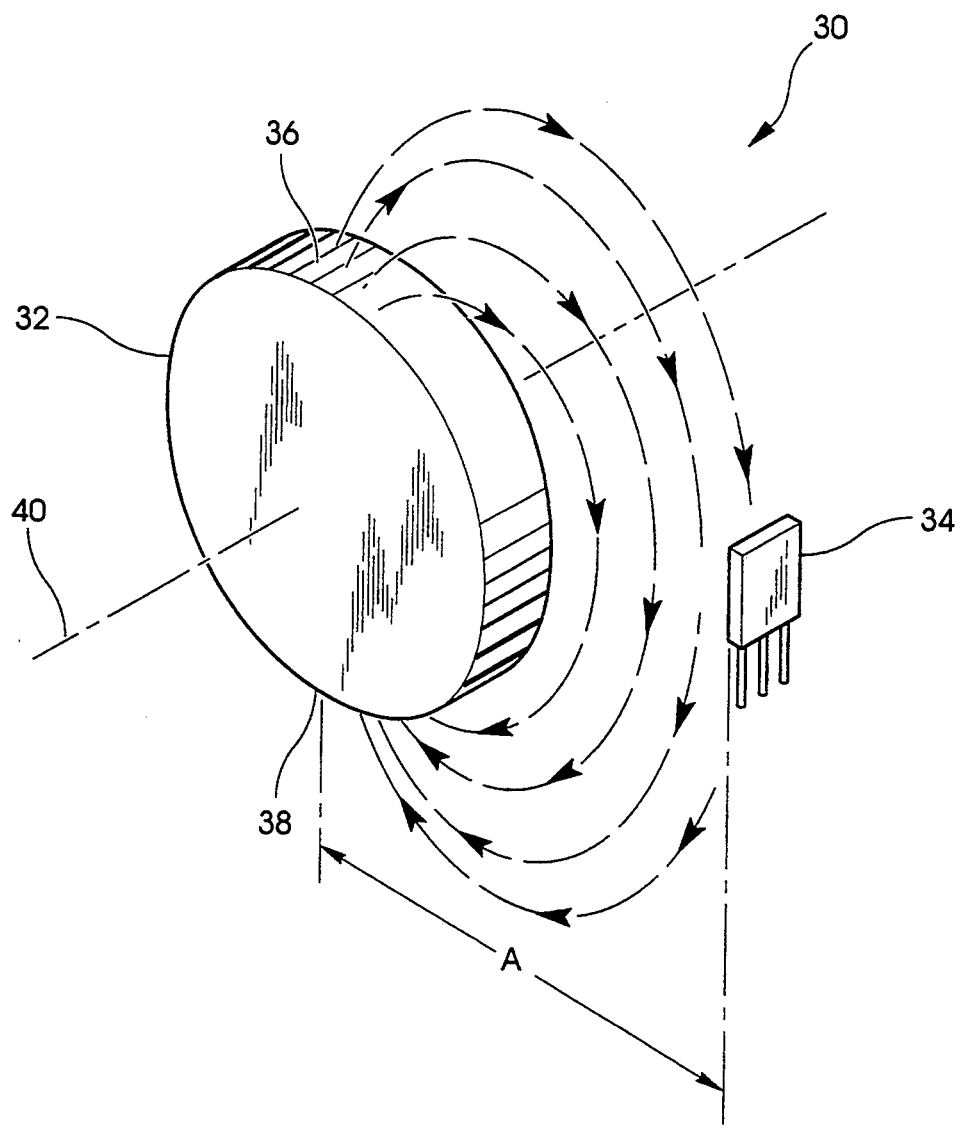
FIG. 2 is a prior art rotational magnetic sensing arrangement including a geometrically shaped magnet that generates radial lines of magnetic flux.

Referring now to FIG. 2, a prior art rotational magnetic sensing arrangement 30 is shown including a magnet 32 spaced a fixed distance 'A' from a Hall effect device 34. Magnetic lines of flux generated by magnet 32 emanate from pole 36 and are received by pole 38. Rotation of magnet 32 about its central axis 40 changes the spaced relation of the magnetic lines of flux generated by magnet 32 with respect to Hall effect device 34 to induce a corresponding change in output signal generated by Hall effect device 34. Magnet 32 is geometrically shaped to produce a linear change in output signal from Hall effect device 34 as magnet 32 and its radial flux field are rotated about axis 40. Because device 30 is dependent on a precise spatial relationship between magnet 32 and Hall effect device 34 (i.e., dimension A), device 30 is susceptible to any deviation from this spatial relationship as well as to any changes in the magnetic flux field generated by magnet 32, such as those changes resulting from misalignment of the magnet relative to the Hall effect device and magnetic interference caused by the presence of nearby ferrous objects.

The present invention represents a significant improvement over prior art arrangement 30 by providing a closely coupled magnetic circuit. The magnetic flux generated by the magnet is parallel to the rotational axis of the sensor and perpendicular to opposing faces of rotor assembly 24 and stator assembly 22. As a result, sensor 20 produces a higher signal to noise ratio and is less susceptible to misalignment. Further, by providing stator pole pieces in close proximity to rotor pole pieces to direct the magnetic flux into the air gap, sensor 20 is less sensitive to the influence of nearby ferrous objects.

Referring back to FIGS. 1A and 1B, stator assembly 22 includes, as means for conducting magnetic flux, stationary pole pieces 42 and 44 centered about central axis 26. Pole pieces 42 and 44 include upstanding flanges 46 and 48, respectively, that define an air gap for receiving a Hall effect device therein. The Hall effect device 50 produces an output signal in accordance with the magnetic flux density impinging thereon. Preferably, a Hall effect device 50 is adhesively attached between flanges 46 and 48 to detect the magnetic flux in the air gap and produce an output voltage signal corresponding to that flux. Hall effect device 50 includes connectors 52 for connecting with associated Hall effect circuitry, such as the amplifier circuit shown in FIG. 11. Pole pieces 42 and 44 are constructed of a ferrous material, such as cold rolled steel, in plate form to define pole faces 54 and 56. Faces 54 and 56 oppose rotor assembly 24 and include integral flanges 46 and 48 that are rolled or formed perpendicularly upward from faces 54 and 56.

Rotor assembly 24 includes means for generating magnetic flux in the form of a geometrically shaped or contoured magnet 58 attached to pole piece 60 and centered about central axis 26. Pole piece 60 includes a pole face 64 that receives magnet 58 thereon with pole face 66 of magnet 58 supported parallel to face 56 of stationary pole piece 44. Pole piece 60 is formed having a flanged or stepped portion that provides an upper pole face 69 parallel to face 54 of stationary pole piece 42 and flush with face 66 of magnet 58. Unlike prior art magnetic sensors that generate radial lines of flux, magnet 58 generates axial lines of magnetic flux that are directed either toward stationary pole faces 54 and 56 or face 64, as indicated in the direction of the arrows 70.

Figure 3:
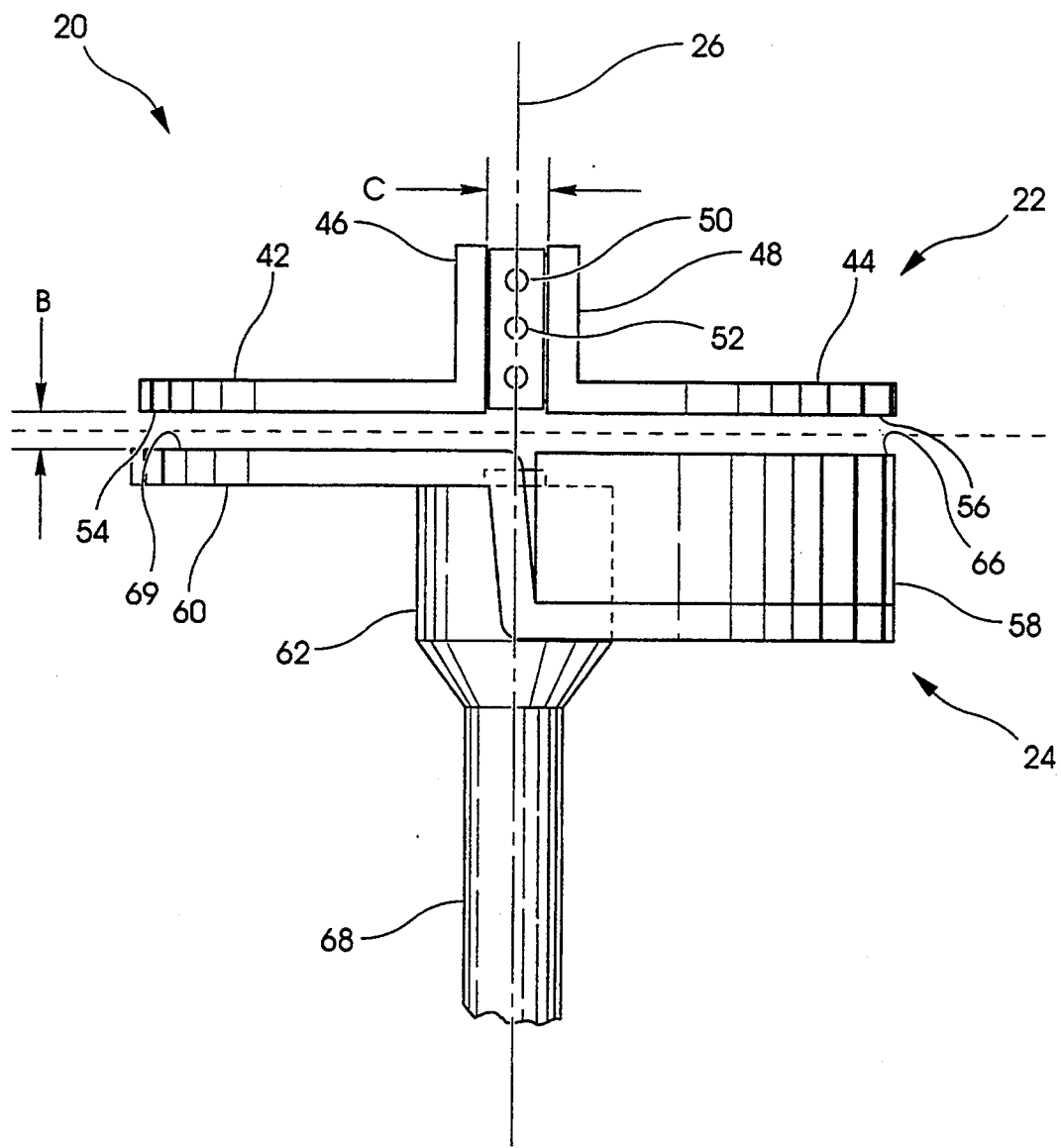
FIG. 3 is a side elevational view of the rotational magnetic sensor of FIGS. 1A and 1B.
Figure 4:
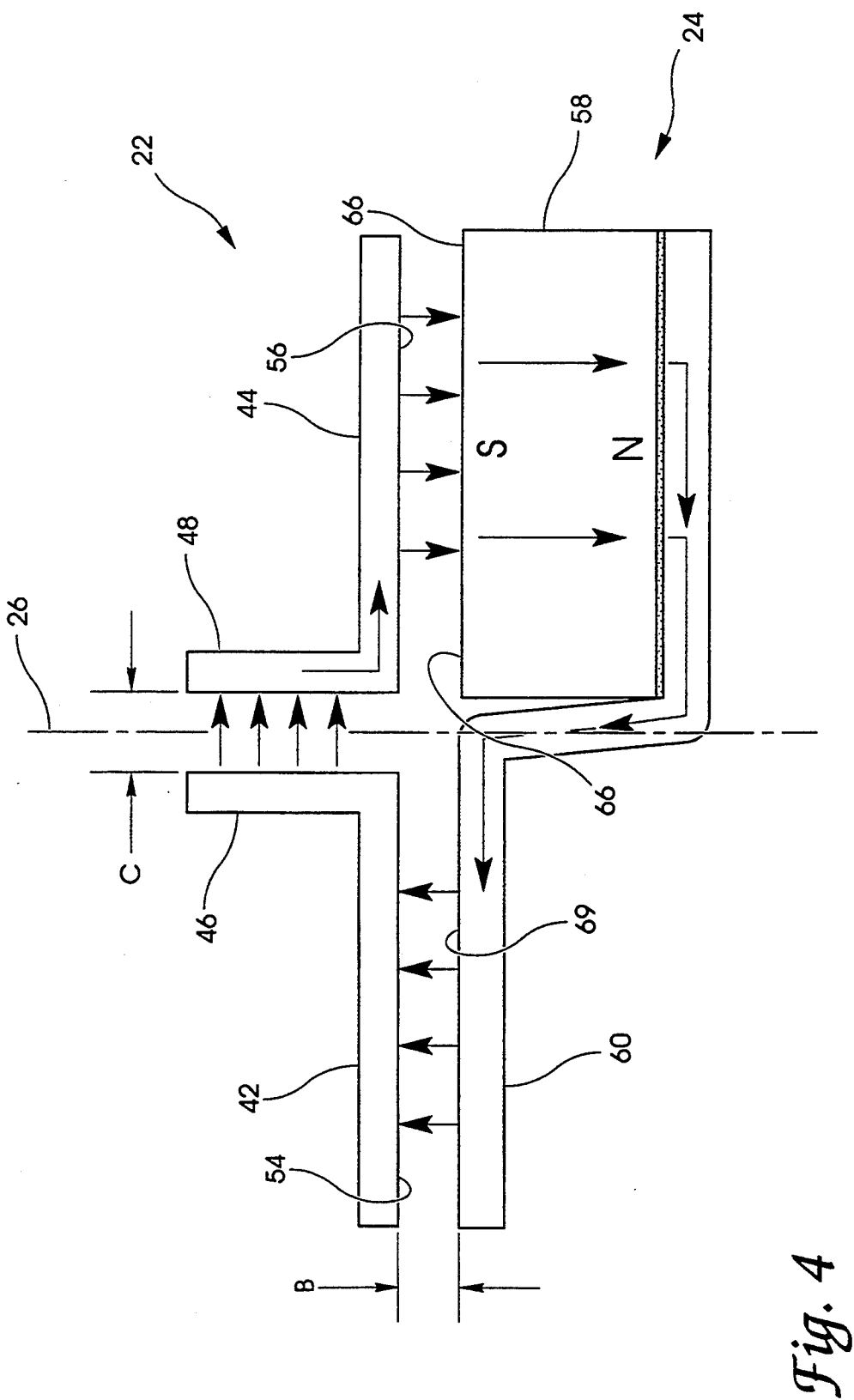
FIG. 4 is a diagrammatic illustration of the magnetic circuit of the rotational magnetic sensor of FIGS. 1A and 1B.

Referring now to FIGS. 3 and 4, rotational magnet sensor 20 is shown defining an air gap 'B' between faces 54 and 56 of stator assembly 22 and faces 66 and 69 of rotor assembly 24. Air gap 'C' is defined by flanges 46 and 48 of stationary pole pieces 42 and 44, respectively. In a preferred embodiment, pole pieces 42 and 44 are molded or encapsulated in plastic to provide a rugged mounting arrangement for sensor 20. Pole pieces 42 and 44 are situated in a predefined spatial relationship, for example parallel, with respect to rotor assembly 24. Preferably, Hall effect device 50 is attached between the pole pieces using an adhesive and/or also by encapsulating in plastic.

Similarly, rotor assembly 24 is a unitary structure formed by attaching magnet 58 using an adhesive to surface 64 of pole piece 60 and by attaching pole piece 60 to hub 62 of shaft 68. Shaft 68 is representative of an object having a varying angular position that is desirably sensed and represented by a linear analog sensor; i.e., throttle valve position. However, sensor 20 is usable as well to sense derivatives of position, such as velocity or acceleration.

Since sensor 20 operates by detecting or measuring the magnetic flux coupled through the stator assembly 22 from the rotor assembly 24, rotor assembly 24 must be positioned in fixed relation to stator assembly 22. In the preferred embodiment, precision bearings (not shown) are provided to support rotor assembly 24 both axially and longitudinally along central axis 26 to maintain a constant air gap 'B' and to maintain the rotor faces in alignment with the stator faces.

In FIG. 4, a magnetic circuit flow diagram for device 20 is shown in greater detail with lines of magnetic flux shown flowing from magnet 58, through stepped pole piece 60, across air gap 'B', through pole piece 42, across air gap 'C', through pole piece 44 and back across air gap 'B' to magnet 58, thereby completing a closely coupled magnetic circuit. As rotor assembly 24 rotates about axis 26, a variable magnetic flux density is generated across air gap 'C'. The polarity and flux density of the magnetic lines of flux flowing across the air gap is a function of the proportional magnetic surface area alignment between faces 54 and 56 of the stationary pole pieces and faces 66 and 69 of rotor assembly 24. For example, as shown in FIG. 4, face 66 of magnet 58 is aligned with face 56 of stationary pole piece 44 to generate a maximum level of flux density across air gap 'C'. Conversely, when magnet 58 is positioned with equal portions of face 66 aligned with faces 54 and 56 of pole pieces 42 and 44, respectively, a zero magnetic flux density is generated across air gap 'C'. In this zero magnetic flux condition, the magnetic forces are balanced out in the magnetic circuit, with magnetic flux flowing only across air gap 'B'. This position is referred to as a magnetically neutral position. Rotation of rotor assembly 24 in either direction from the neutral position generates a magnetic flux having an assigned polarity (i.e., north or south) across air gap 'C'.

Unlike prior art magnetic circuits in which a magnet supplies magnetic flux in a direction perpendicular to its axis of rotation, the magnet in sensor 20 supplies magnetic flux in a direction parallel to its axis of rotation. As such, a varying portion of the magnetic flux generated by magnet 58 is provided into the magnetic circuit as rotor assembly 24 rotates relative to stator assembly 22, thereby yielding a sensor less susceptible to magnetic interference and misalignment.

Figure 6A:
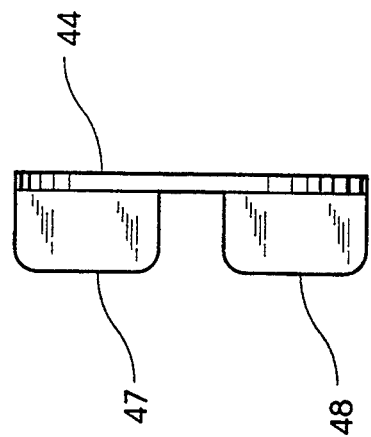
FIG. 6A is a side elevational view of the alternate stator plates of FIG. 5A.
Figure 5A:
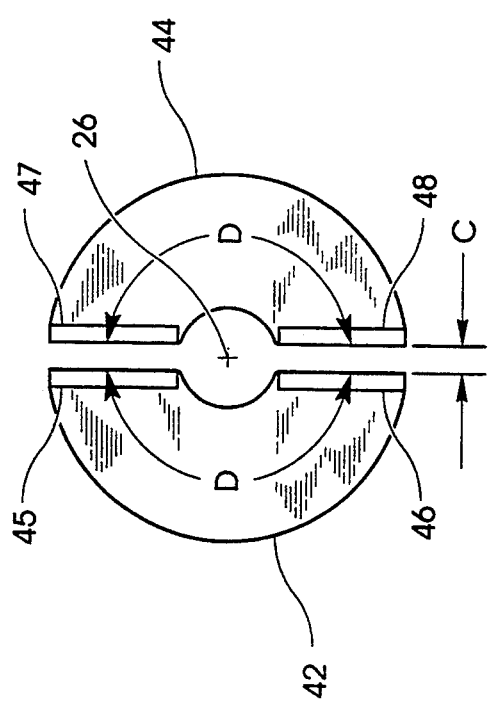
FIG. 5A is a plan view of alternate 180 degree stationary stator plates of the rotational magnetic sensor of FIGS. 1A and 1B.

Referring now to FIGS. 5 and 6, stator pole pieces 42 and 44 are shown in greater detail. As shown in FIG. 5, each of stator pole pieces 42 and 44 span an angle D of 180 degrees to define air gap 'C' between matching flanges 46 and 48. As such, magnetic flux flowing from pole piece 42 to 44 is directed between flanges 46 and 48 into air gap 'C'. Alternately, as shown in FIGS. 5A and 6A, flanges 45 and 47 can also be provided at the opposite ends of the 180 degree span symmetric with flanges 46 and 48 to promote increased magnetic coupling between the stator pole pieces.

Figure 7:
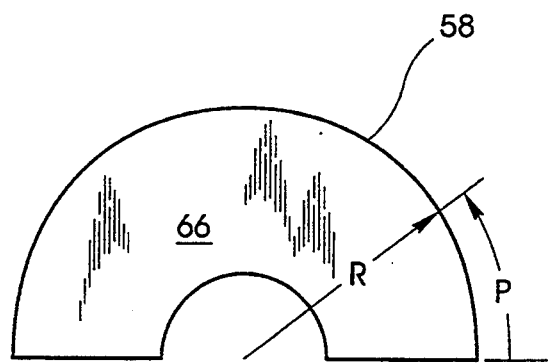
FIG. 7 is a plan view of a geometrically shaped or contoured magnet of the rotational magnetic sensor of FIGS. 1A and 1B that generates axial lines of magnetic flux.
Figure 8:
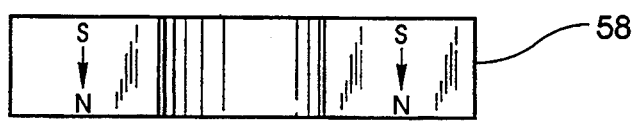
FIG. 8 is a side elevational view of the geometrically shaped magnet of FIG. 7.

Referring now to FIGS. 7 and 8, magnet 58 spans a 180 degree arc. Although contemplated as having a true semi-circular shape or profile, in the preferred embodiment magnet 58 is geometrically shaped or contoured in radial length to correct for both the magnetic coupling and shunting effects that occur when the rotor assembly is rotated through zero magnetic flux and maximum magnetic flux positions. These magnetic effects can detract from a truly linear analog sensor output as shown, for example, in FIG. 9. As an alternative to geometrically shaping or contouring magnet 58, upper pole face 69 of pole piece 60 may be geometrically shaped or contoured to correct for both the magnetic coupling and shunting effects. In either case, whether upper face 69 or magnet 58 is geometrically shaped, the aligned portion of the stator and rotor assemblies varies in a compensating non-linear fashion as the rotor assembly rotates with respect to the stator assembly to cause a linear output signal to be produced by the Hall effect device.

Figure 9:
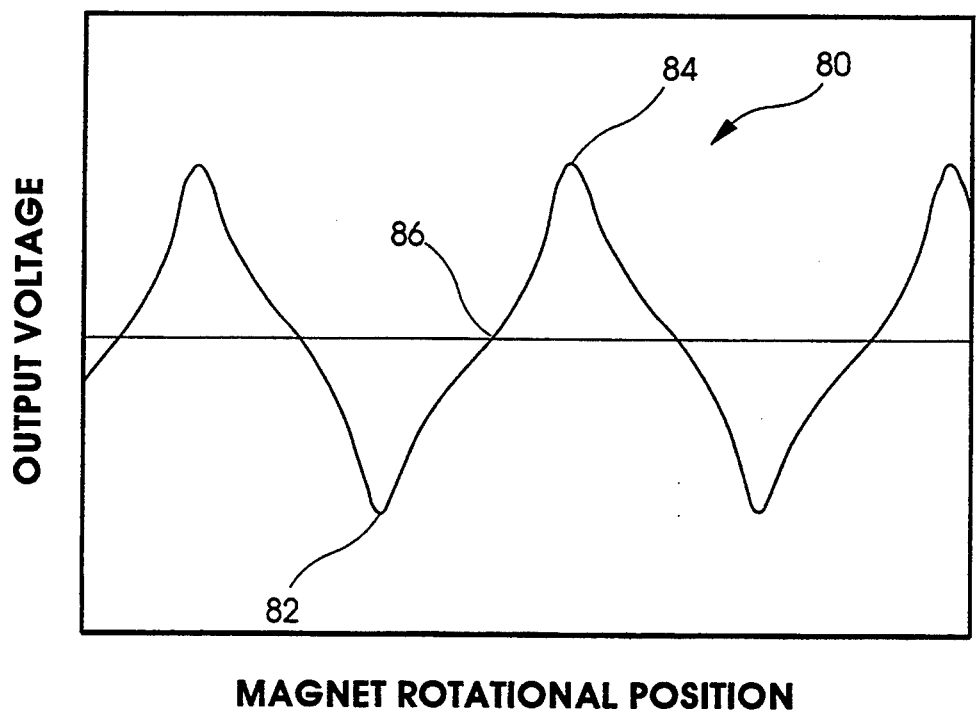
FIG. 9 is a graph depicting the output voltage waveform of a rotational magnetic sensor having a true, semi-circular shaped magnet.

In FIG. 9, the output voltage waveform 80 developed by a sensor having a magnet with a true semi-circular profile, rather than a magnet with a geometrically shaped profile, is shown. Between opposite polarity maximum flux points 82 and 84, output voltage waveform 80 is slightly S-shaped having an inflection point 86 at the zero flux density level. In the vicinity of point 86, the magnet 58 is near its neutral position and magnetic shunting occurs to alter the output voltage waveform; i.e., the measured flux density changes disproportionately in air gap 'C' versus angular position as rotor assembly 24 rotates through its zero flux position. In the vicinity of maximum flux density locations 82 and 84, the face 66 of magnet 58 is nearly fully aligned with one of the stator pole pieces, and magnetic coupling occurs to alter the output voltage waveform; i.e., the measured flux density changes disproportionately in air gap 'C' as rotor assembly 24 rotates through its maximum flux positions. However, this non-linear magnetic interaction between the rotor and stator assemblies is readily solved by slightly modifying or "geometrically" altering the cross-sectional profile of magnet 58 to compensate for the shunting and coupling non-linearities.

Referring back to FIGS. 7 and 8, the radius 'R' of magnet 58 is altered as a function of angular position 'P' along the profile of magnet 58 to correct for the above-described non-linear effects. As such, the operative opposing surface area between face 66 of magnet 58 and face 56 of pole piece 44 changes in a non-linear fashion with incremental rotation of rotor assembly 24 to offset the magnetic coupling and shunting effects so that a linear output waveform is produced by the Hall effect device. The particular geometric shape and corresponding pole face area of magnet 58 is application specific and empirically determined based on various magnetic circuit characteristics such as magnet diameter, magnet strength and material, air gap dimensions ('B' and 'C'), desired output gain or slope, desired range of rotational movement, acceptable linearity error, type of Hall effect device and acceptable cost. Nevertheless, one such geometric shape for a magnet constructed from Alnico 8 and having a thickness of 0.148 inches and an inner radius of 0.125 inches is provided according to the Table 1 in reference to FIG. 7:

TABLE 1

| ANGLE (degrees) | RADIUS (inches) |
| --- | --- |
| P = 0–10° | R = 0.351 |
| P = 10–20° | R = 0.355 |
| P = 20–30° | R = 0.359 |
| P = 30–40° | R = 0.363 |
| P = 40–50° | R = 0.367 |
| P = 50–60° | R = 0.371 |
| P = 60–120° | R = 0.375 |
| P = 120–130° | R = 0.371 |
| P = 130–140° | R = 0.367 |
| P = 140–150° | R = 0.363 |
| P = 150–160° | R = 0.359 |
| P = 160–170° | R = 0.355 |
| P = 170–180° | R = 0.351 |

Figure 10:
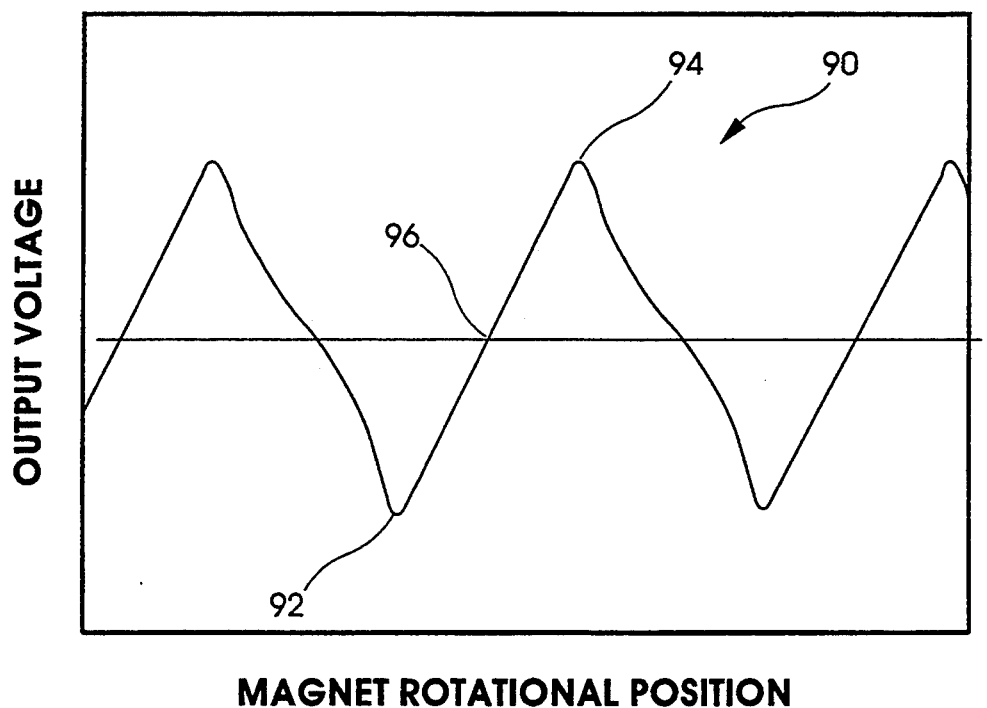
FIG. 10 is a graph depicting the output voltage waveform of the rotational magnetic sensor of FIGS. 1A and 1B.

Referring now to FIG. 10, the linear output voltage waveform 90 developed by sensor 20 with geometrically shaped magnet 58 is shown. Between opposite polarity maximum flux points 92 and 94, output voltage waveform 90 is linear, both in the vicinity of zero flux point 96 and maximum flux density points 92 and 94. The geometrically shaped magnet offsets the magnetic shunting effect occurring near point 96 and the magnetic coupling effects occurring near points and 96.

Figure 11:
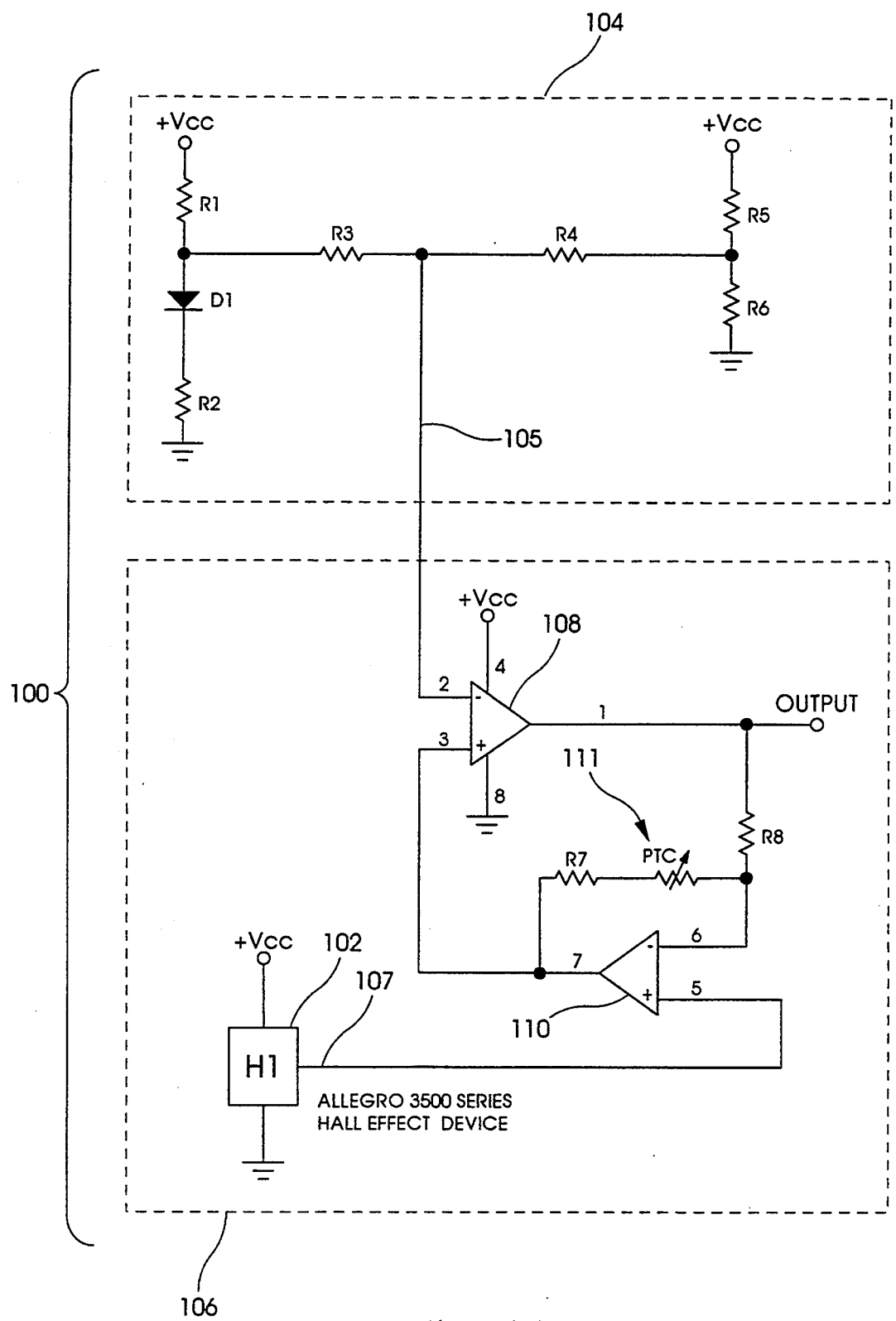
FIG. 11 is a schematic of a temperature compensated Hall effect device amplifier circuit.

Referring now to FIG. 11, a schematic of a temperature compensated Hall effect device amplifier circuit is shown for use with a magnetic sensor incorporating a Hall effect device 102 similar to Hall effect device 50 of sensor 20. Circuit 100 provides basic amplifier/gain control of the output voltage from Hall effect device 102. Because sensor 20 is usable in automotive applications and, therefore, is likely to be subjected to harsh environments, additional circuitry is required to compensate for the effects of temperature variance on the operative characteristics of the Hall effect device. For example, the magnetic flux at which a zero voltage signal is produced by the Hall effect device can change with temperature. Similarly, the sensitivity or gain of the voltage output signal as a function of the sensed magnetic flux can change with the ambient temperature surrounding the Hall effect device.

To compensate for these temperature effects, zero magnetic flux density offset voltage drift correction and Hall effect device sensitivity correction are provided by circuit 100. In particular, circuit 100 compensates for operational differences attributable to temperatures ranging from −40 to 150 degrees Celsius typically encountered in an engine compartment of a motor vehicle. Zero gauss offset correction is provided in portion 104 of circuit 100, wherein resistors R1–R6 and diode D1 are connected in a conventional wheatstone bridge arrangement. It is well known that silicon diodes exhibit a predictable variation in forward bias voltage dependent upon temperature. The bias voltage temperature drift (which is substantially linear) provides a correction factor for zero flux offset drift of the Hall effect device 102. The attenuated voltage signal at 105 from circuit portion 104 is supplied to the inverting input of operational amplifier 108. The output voltage signal at 107 from Hall effect device 102 is supplied to the non-inverting input of operational amplifier 110. Operational amplifiers 108 and 110 are conventionally connected to provide an active feedback loop amplifier, wherein the values of resistors R7 and PTC control the total loop gain of the feedback amplifier combination. The positive temperature coefficient resistor (PTC) 111, connected in series with resistor R7, alters the gain of the amplifier 108 in response to changes in ambient air temperature. As a result, circuit 104, which provides the zero gauss temperature offset correction, functions independently of circuit portion 106, which provides temperature correction for the sensitivity level of the Hall effect device.

Figures 12A, 12B:
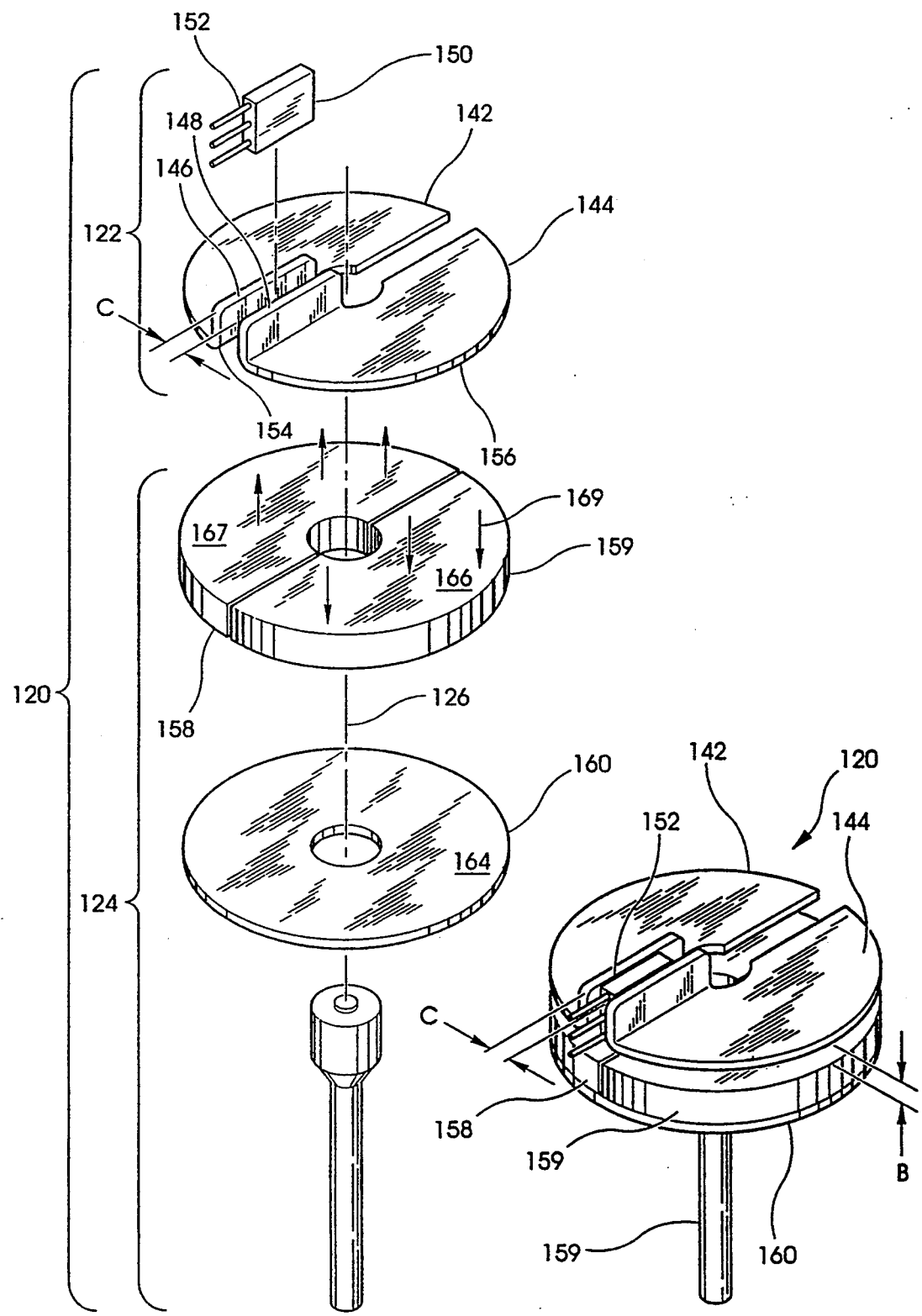
FIG. 12A is an exploded view of a rotational magnetic sensor according to a second embodiment of the present invention.
FIG. 12B is a perspective view of the rotational magnetic sensor of FIG. 12A assembled.

Referring now to FIGS. 12A and 12B, an alternate embodiment of a sensor 120 according to the present invention is shown. Rotational magnetic sensor 120 includes a stator assembly 122 similar to stator assembly 22 of sensor 20. Stator assembly 122 includes stationary pole pieces 142 and 144 centered about central axis 126 of sensor 120. Pole pieces 142 and 144 each include upstanding flanges 146 and 148, respectively, that define an air gap 'C'. Hall effect device 150 is adhesively attached between flanges 146 and 148 and produces an output signal corresponding to the flux density in gap 'C'.

Unlike sensor 20, sensor 120 includes a rotor assembly 124 having two magnets, 158 and 159, attached to a planar, rather than stepped, pole piece 160. Pole piece 160 supports magnets 158 and 159 on face 164 with face 166 of magnet 159 situated flush with face 167 of magnet 158, and parallel to pole faces 156 and 154. Magnets 158 and 159 are geometrically shaped or contoured and are attached to pole piece 160 and centered about central axis 126. Similar to magnet 58, magnets 158 and 159 generate axial lines of magnetic flux 169 that are directed perpendicular to stationary pole faces 154 and 156.

Figure 13:
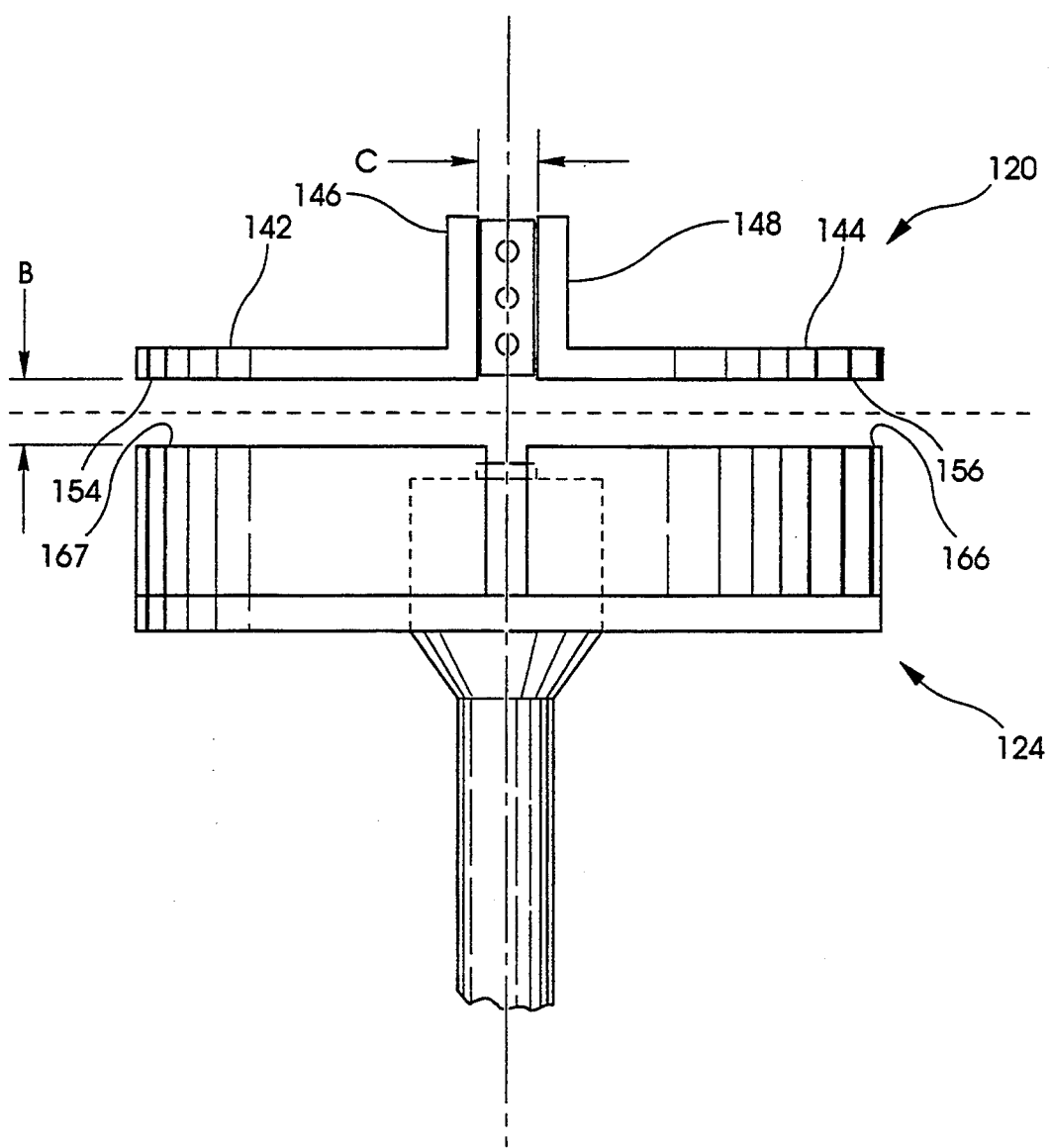
FIG. 13 is a side elevational view of the rotational magnetic sensor of FIGS. 12A and 12B.

Referring now to FIG. 13, an air gap 'B' is defined between pole faces 154 and 156 of stator assembly 122 and faces 166 and 167 of rotor assembly 124. An air gap 'C' is defined between flanges 146 and 148 of stationary pole pieces 142 and 144, respectively. Similar to pole pieces 42 and 44 of sensor 20, pole pieces 142 and 144 are situated in a predefined spatial relationship, for example parallel, with respect to rotor assembly 124. Preferably, stationary pole pieces 142 and 144 are molded or encapsulated in plastic to provide a rugged mounting arrangement for sensor 120, and Hall effect device 150 is attached between the pole pieces using an adhesive and/or also by encapsulating in plastic.

Figure 14:
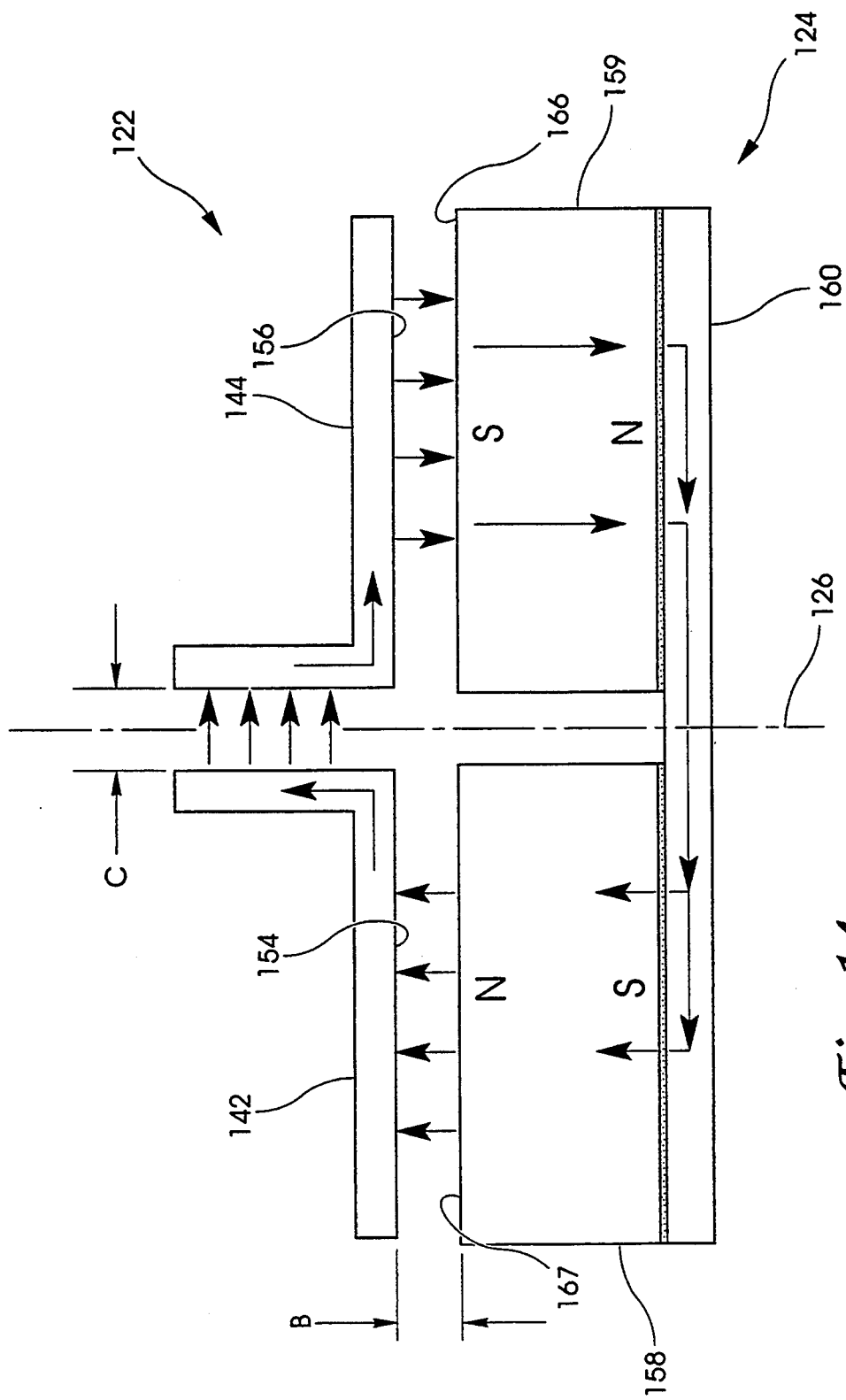
FIG. 14 is a diagrammatic illustration of the magnetic circuit of the rotational magnetic sensor of FIGS. 12A and 12B.

Referring now to FIG. 14, the magnetic circuit for device 120 is shown in detail with lines of magnetic flux shown flowing from magnet 159, through pole piece 160 to combine with flux generated by magnet 158, across air gap 'B', through pole piece 142, across air gap 'C', through pole piece 144 and back across air gap 'B' to magnet 159. Unlike sensor 20, which employs only a single magnet mountable in either a north-south or south-north orientation depending on the desired polarity, magnets 158 and 159 must be mounted in rotor assembly 124 with opposite orientations; i.e., magnet 158 mounted north-south and magnet 159 mounted south-north (as shown) or both reversed. As rotor assembly 124 rotates about axis 126, a variable magnetic flux density is generated across air gaps 'B' and 'C' in accordance with the magnetic coupling of flux from the magnets 158 and 159 with the pole pieces 142 and 144. Similar to sensor 20, the polarity and flux density of the magnetic lines of flux in air gap 'C' is a function of the proportional magnetic surface area alignment between faces 154 and 156 of the stationary pole pieces and faces 167 and 166 of magnets 158 and 159, respectively. By incorporating two Alnico 8 magnets 158 and 159 in sensor 120, rather than the single magnet 58 of sensor 20, the measured magnetic flux density and corresponding output voltage of the Hall effect device is effectively doubled. Alternately, magnets 158 and 159 of sensor 120 may be constructed from an inexpensive, lower flux output magnetic material while maintaining the same measured magnetic flux density and corresponding output voltage of the Hall effect device of device 20.

Figures 15A, 15B:
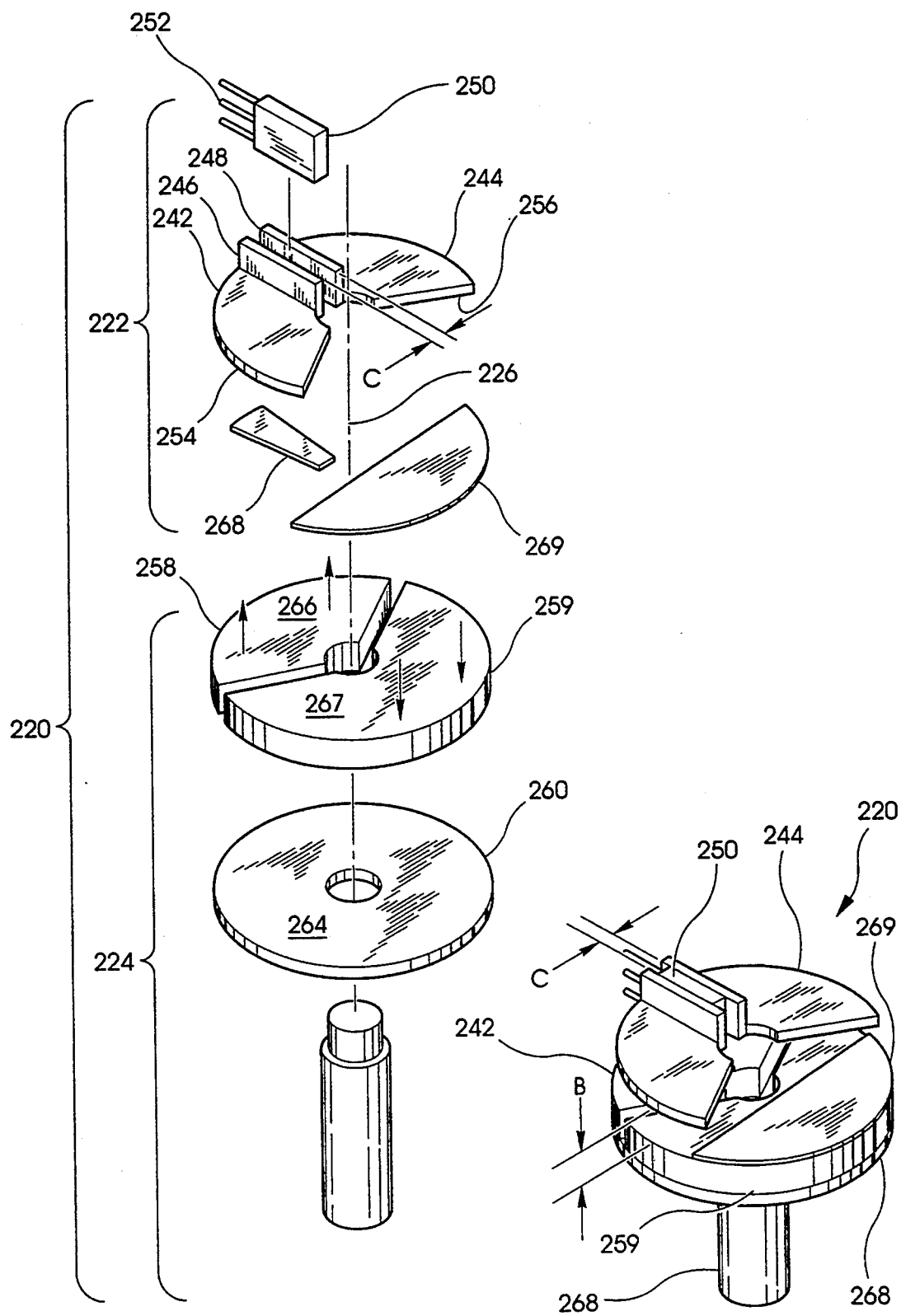
FIG. 15A is an exploded view of a rotational magnetic sensor according to a third embodiment of the present invention.
FIG. 15B is a perspective view of the rotational magnetic sensor of FIG. 15A assembled.

Referring to FIGS. 15A and 15B, another embodiment of a magnetic sensor 220 according to the present invention is shown. Rotational magnetic sensor 220 includes stationary magnetic fringing shields 268 and 269 in the air gap between the rotor and stator assemblies.

Rotational magnetic sensor 220 includes a stator assembly 222. Stator assembly 222 includes stationary pole pieces 242 and 244 that span 120 degrees rather than the 180 span of, for example, pole pieces 42 and 142. Pole pieces 242 and 244 each include upstanding flanges 246 and 248, respectively, that define an air gap 'C'. Hall effect device 250 is adhesively attached between flanges 246 and 248 to measure the magnetic flux density in the air gap and produce an output signal corresponding to the flux density.

Similar to sensor 120, sensor 220 includes a rotor assembly 224 having two magnets, 258 and 259, attached to a planar pole piece 260. However, magnets 258 and 259 span approximately 120 and 240 degrees, respectively, rather than 180 degrees as in sensor 120. Face 264 of pole piece 260 supports magnets 258 and 259 with face 266 of magnet 258 situated flush with face 267 of magnet 259 and parallel to pole faces 254 and 256. Unlike sensors 20 and 120, magnets 258 and 259 have a true semicircular profile since magnetic fringe shields are provided in sensor 220, rather than geometrically shaped magnets, as a means for compensating for non-linear effects. Magnets 258 and 259 are received on pole piece 260 centered about central axis 226. Similar to magnets 58, 158 and 159, magnets 258 and 259 generate axial lines of magnetic flux that are perpendicular to stationary pole faces 254 and 256 and perpendicular to faces 266 and 267.

Magnetic fringing shields 268 and 269 are statically positioned in the air gap between the rotor and stator assemblies to reduce the non-linear magnetic effects that occur near zero flux density and maximum flux density positions of rotor assembly 224. Preferably, magnetic fringing shields 268 and 269 are insulated from and attached to the faces of pole pieces 242 and 244. In particular, magnetic fringing shield 268 is sized to span across the measured air gap 'C', and magnetic fringing shield 269 is sized to span approximately 120 degrees between the stator pole pieces 242 and 244. A linear analog waveform output signal is produced in the 180 degree span opposite magnetic fringing shield 269. Similar to sensor 120, magnets 258 and 259 must be mounted to rotor assembly 224 in opposite orientations or polarities; i.e., magnet 258 mounted north-south and magnet 259 mounted south-north or vice versa.

As rotor assembly 224 rotates about axis 226, a corresponding magnetic flux density is generated in air gaps 'B' and 'C'. Similar to sensors 20 and 120, the polarity and flux density of the magnetic lines of flux flowing in air gap 'C' is a function of the proportional magnetic surface area alignment between faces 254 and 256 of the stationary pole pieces and faces 266 and 267 of magnets 258 and 259, respectively. As shown in FIGS. 15A and 15B, magnets 258 and 259 are aligned with equal portions of their respective faces across faces 254 and 256 of pole pieces 242 and 244, respectively (i.e., magnet 258 is bisected into two 60 degree portions relative to air gap 'C' and couples equal amounts of magnetic flux into air gap 'B', and magnet 259 has two 30 degree portions adjacent to ends of fringing shield 269 and couples equal amounts of magnetic flux into air gap 'B'). In the position shown, magnetic flux lines appear only in air gap 'B' and zero magnetic flux is found in air gap 'C'. In this "balanced" zero magnetic flux condition, the magnetic forces are balanced out in the magnetic circuit to define a magnetically neutral position, wherein rotation of rotor assembly 224 in either direction from this neutral position generates a magnetic flux having an assigned polarity across air gap 'C'. Conversely, when face 266 of magnet 258 and an equal portion of face 267 of magnet 259 are fully aligned with either faces 254 or 256 of stationary pole pieces 242 or 244, respectively, maximum levels of flux density appear in air gap 'C'.

Figure 16:
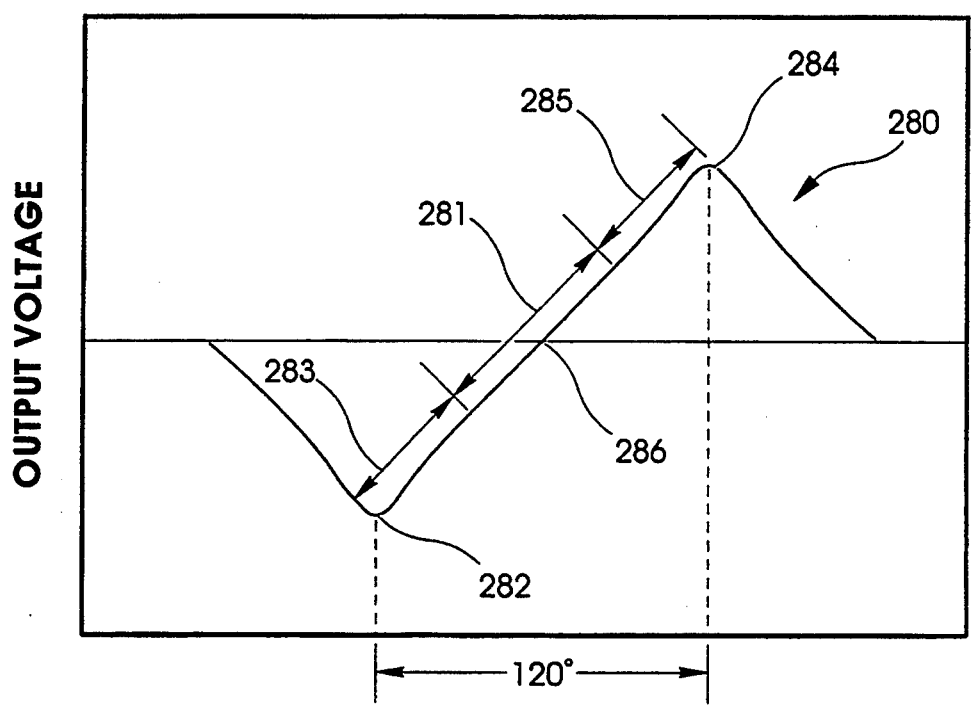
FIG. 16 is a graph depicting the output voltage waveform of the rotational magnetic sensor of FIGS. 15A and 15B.
Figure 17:
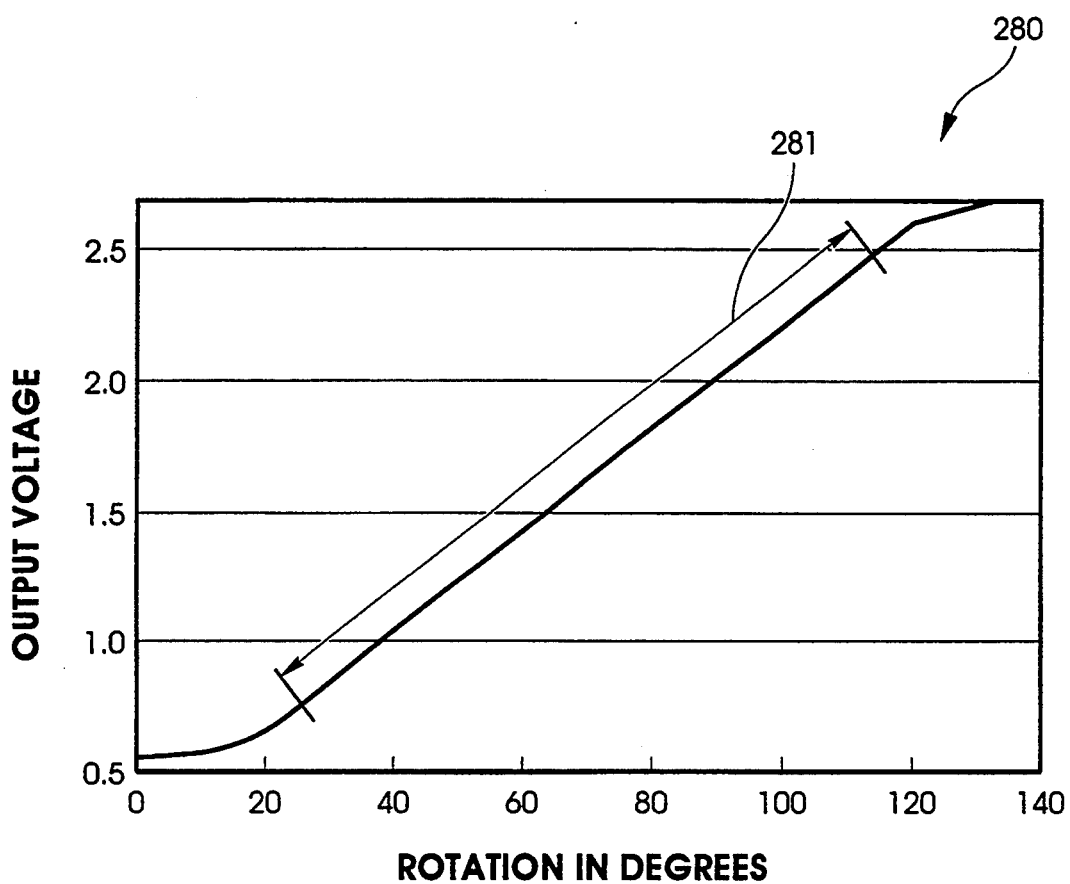
FIG. 17 is a graph depicting the output voltage for the rotational magnetic sensor of FIGS. 15A and 15B as a function of its angular position.
Figures 18A, 18B:
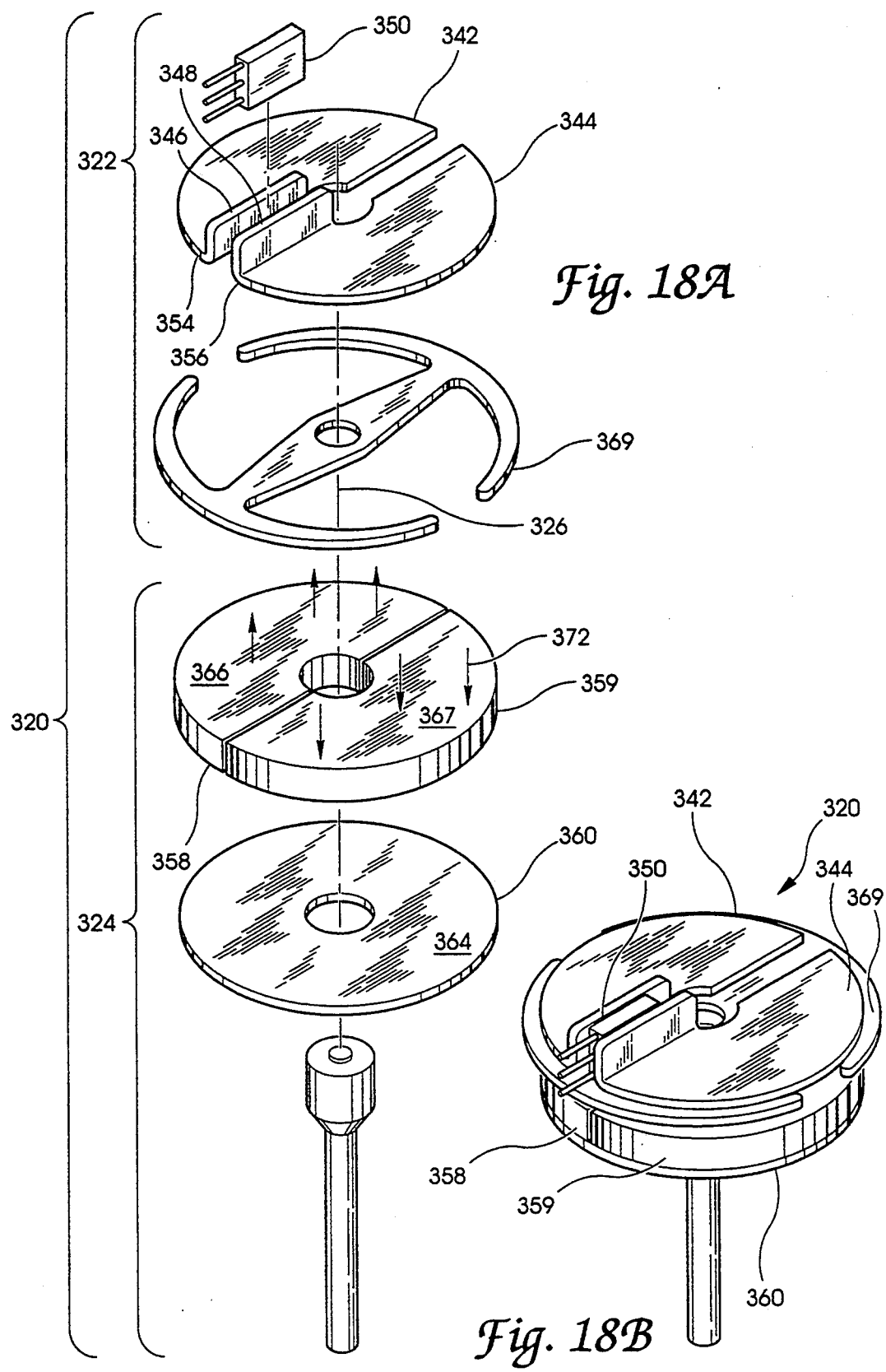
FIG. 18A is an exploded view of a rotational magnetic sensor according to a fourth embodiment of the present invention.
FIG. 18B is a perspective view of the rotational magnetic sensor of FIG. 18A assembled.

Referring now to FIGS. 16 and 17, a graph of the output voltage signal waveform 280, developed by sensor 220, is shown. In the 120 degrees spanned by opposite polarity maximum flux points 282 and 284, the signal waveform 280 includes a linear portion 281 and non-linear or slightly S-shaped portions 283 and 285. In the vicinity of the zero flux density point 286, magnets 258 and 259 are at their neutral position and magnetic fringing shield 268 prevents magnetic shunting from occurring to alter the output voltage waveform. In the vicinity of maximum flux points 282 and 284, magnets 258 and 259 are fully aligned with the stator pole pieces and magnetic fringing shield 269 sufficiently reduces the effects of magnetic coupling so that linear portion 281 is defined. In FIG. 17, the output voltage waveform 280 is depicted as a function of the rotation of rotor assembly 224. Linear portion 281 is shown in greater detail having a usable span of approximately three-fourths of the 120 degree span between maximum flux density points; i.e., approximately 88 degrees. In the linear portion 281, the output voltage signal ranges from approximately 0.75 volts to 2.5 volts linearly corresponding to angular position of rotor assembly 224, with respect to the stator, between approximately 16 degrees and 104 degrees. Referring to FIGS. 18A and 18B, another embodiment of a magnetic sensor 320 is shown according to the present invention. Sensor 320 includes geometrically shaped or contoured magnets 358 and 359 as well as a stationary magnetic flinging shield 369 in the air gap between the rotor and stator assemblies to compensate for the non-linear magnetic coupling and shunting effects and produce a linear output voltage waveform.

Stator assembly 322 includes stationary pole pieces 342 and 344 that span 180 degrees similar to pole pieces 42 and 44 and pole pieces 142 and 144. Pole pieces 342 and 344 include upstanding flanges 346 and 348, respectively, that define an air gap 'C'. A Hall effect device 350 is adhesively attached between flanges 346 and 348 to measure the magnetic flux density in the air gap and produce an output signal corresponding to the flux density.

Similar to sensor 120, sensor 320 includes a rotor assembly 324 having the two magnets, 358 and 359, attached to a planar pole piece 360 and centered about central axis 326. Face 364 of pole piece 360 supports magnets 358 and 359 with face 366 of magnet 358 situated flush with face 367 of magnet 359 and parallel to pole faces 354 and 356, respectively, of stationary pole pieces 342 and 344. As a means for compensating for non-linear effects, magnetic fringe shield 369 is provided geometrically shaped or contoured corresponding to the contour of geometrically shaped magnets 358 and 359.

Figure 19:
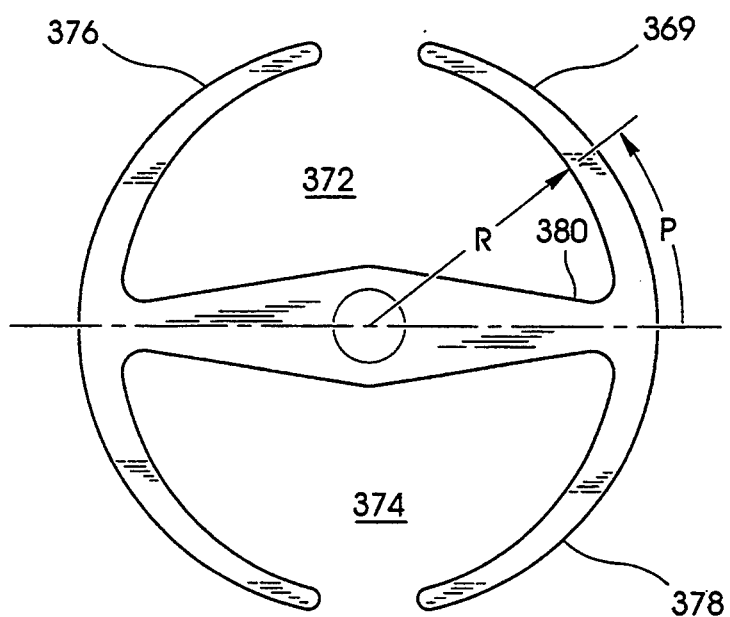
FIG. 19 is a plan view of a fringing shield that is uses with geometrically shaped or contoured magnets of the rotational magnetic sensor of FIGS. 18A and 18B.

Referring now also to FIG. 19, magnetic fringe shield 369 includes openings 372 and 374 that permit axial lines of magnetic flux generated by magnets 358 and 359 to flow therethrough perpendicular to stationary pole faces 354 and 356, as indicated in the direction of arrows 372. The circumferential edge portions 376 and 378 of shield 369 substantially encompass the periphery of magnets 358 and 359 to prevent fringing of magnetic flux generated near the edges of the magnets. Magnetic fringing shield 369 is statically positioned in the air gap between the rotor and stator assemblies and includes a central portion 380 sized to span across the measured air gap 'C' to reduce the non-linear magnetic effects that occur between the rotor and stator assemblies as the sensor rotates through zero flux density and maximum flux density positions. Preferably, magnetic fringing shield 369 is insulated from and attached to the faces of pole pieces 342 and 344. In one specific embodiment, sensor 320 includes geometrically shaped magnets contoured similar to magnet 58 of sensor 20. In this specific embodiment, magnetic fringe shield 369 is matched to the geometric profile of magnet 358 and 359, wherein the inner radius 'R' of shield 369 is altered as a function of angular position 'P' according to Table 2:

TABLE 2

| ANGLE (degrees) | RADIUS (inches) |
|---|---|
| P = 90–100° | R = 0.375 |
| P = 100–110° | R = 0.373 |

TABLE 2-continued

| ANGLE (degrees) | RADIUS (inches) |
|---|---|
| P = 110–120° | R = 0.371 |
| P = 120–130° | R = 0.367 |
| P = 130–140° | R = 0.363 |
| P = 140–150° | R = 0.359 |
| P = 150–160° | R = 0.355 |
| P = 160–170° | R = 0.351 |
| P = 170–180° | R = 0.347 |
| P = 180–190° | R = 0.343 |
| P = 190–200° | R = 0.347 |
| P = 200–210° | R = 0.351 |
| P = 210–220° | R = 0.355 |
| P = 220–230° | R = 0.359 |
| P = 230–240° | R = 0.363 |
| P = 240–250° | R = 0.367 |
| P = 250–260° | R = 0.371 |
| P = 260–270° | R = 0.373 |
| P = 270–280° | R = 0.375 |

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A magnetic rotational position sensor for sensing angular position of an object about a rotational axis, comprising:

a magnetic flux sensor operative to produce an output signal corresponding to a sensed level of magnetic flux;

magnetic means for producing magnetic flux;

means for conducting magnetic flux between said magnetic means and said magnetic flux sensor including stationary means for conducting said magnetic flux across a stationary surface perpendicular to said axis of rotation and rotating means for conducting magnetic flux across a rotating surface perpendicular to said axis of rotation, said stationary surface being spaced a predetermined distance from said rotating surface to define an air gap therebetween;

said magnetic means producing said magnetic flux parallel to said axis of rotation and perpendicular to said stationary surface and said rotating surface; and wherein said rotating means rotates relative to said stationary means to align a portion of said rotating surface with a portion of said stationary surface to conduct a level of magnetic flux proportional to the amount of surface area alignment of said portion of said stationary surface and said portion of said rotating surface, said level of magnetic flux being conducted between said magnetic means and said magnetic flux sensor and across said predetermined air gap to complete a magnetic circuit.

2. The magnetic rotational position sensor of claim 1, wherein:

said stationary means includes a stationary pole piece having a stationary pole face perpendicular to said axis of rotation, said magnetic flux sensor being attached to said stationary pole piece and being oriented to sense the level of magnetic flux being conducted in said stationary pole piece;

said rotating means includes a rotating pole piece, said magnetic means being attached to said rotating pole piece and having a rotating pole face perpendicular to said axis of rotation; and said rotating pole piece rotates relative to said stationary pole piece to align a portion of said rotating pole face with a portion of said stationary pole face.

3. The magnetic rotational position sensor of claim 2, wherein:

said magnetic means includes a geometrically shaped magnet contoured to reduce non-linear interactive magnetic coupling and shunting effects between said stationary pole piece and said rotating pole piece, said geometrically shaped magnet producing lines of magnetic flux normal to said sta..onary and rotating pole faces.

4. The magnetic rotational position sensor of claim 3, and further comprising:

a magnetic fringing shield attached to a pole piece and disposed in said predetermined air gap between said stationary and rotating pole pieces to reduce the non-linear interactive magnetic coupling and shunting effects.

5. The magnetic rotational position sensor of claim 2, and further comprising:

a magnetic fringing shield attached to one of said pole pieces and disposed in said predetermined air gap between said stationary and rotating pole pieces to reduce non-linear interactive magnetic coupling and shunting effects; and wherein said magnetic means includes a magnet having a circular shape, said magnet producing lines of magnetic flux normal to said stationary and rotating pole faces.

6. The magnetic rotational position sensor of claim 1, wherein said magnetic flux sensor is a Hall effect device having a voltage output signal corresponding to the sensed level of magnetic flux.

7. The magnetic rotational position sensor of claim 6, and further comprising circuit means for amplifying the voltage output signal of said Hall effect device.

8. A magnetic rotational position sensor for sensing angular position of an object, comprising:

first and second stationary pole pieces having first and second stationary pole faces, respectively, said first and second stationary pole pieces being spaced a first predetermined distance apart to define a first predetermined air gap therebetween;

a magnetic flux sensor situated in said first predetermined air gap, said magnetic flux sensor producing an output signal corresponding to a level of magnetic flux in said first predetermined air gap;

a rotating pole piece, said rotating pole piece defining an axis of rotation for said magnetic rotational position sensor;

a first magnet having a first magnet pole face, said first magnet generating magnetic flux in a direction parallel to said axis of rotation and being attached to said rotating pole piece with said first magnet pole face spaced a second predetermined distance from said first and second stationary pole faces to define a second predetermined air gap; and wherein said rotating pole piece rotates relative to said first and second stationary pole pieces about said axis of rotation to align a portion of said first magnet pole face with portions of said first and second stationary pole faces and supply a level of magnetic flux corresponding to the aligned portions of said first magnet pole face and said first and second stationary pole faces into said first predetermined air gap.

9. The magnetic rotational position sensor of claim 8, wherein:

said rotating pole piece includes upper and lower rotating pole faces, said first magnet attached to said lower rotating pole face with said first magnet pole face flush with said upper rotating pole face.

10. The magnetic rotational position sensor of claim 9, wherein said first and second stationary pole pieces include first and second upstanding flanges, respectively, said first and second upstanding flanges being spaced said first predetermined distance apart to define said first predetermined air gap.

11. The magnetic rotational position sensor of claim 10, wherein said first magnet is contoured to supply a level of magnetic flux into said first predetermined-air gap that compensates, for non-linear magnetic effects and causes said magnetic flux sensor to produce a linear output signal corresponding to the level of magnetic flux in said first predetermined air gap.

12. The magnetic rotational position sensor of claim 11, and further comprising a magnetic fringing shield attached to one of said pole pieces and disposed in said predetermined air gap between said stationary and rotating pole pieces to compensate for non-linear magnetic effects between said first and second stationary pole pieces and said rotating pole piece.

13. The magnetic rotational position sensor of claim 8, and further comprising:

a second magnet including a second magnet pole face; and wherein said rotating pole piece is flat to define a common rotating pole face, said first and second magnets being attached to said common rotating pole face with said first magnet pole face flush with said second magnet pole face, said first and second magnet pole faces being parallel to and spaced said second predetermined distance from said first and second stationary faces to define said second predetermined air gap.

14. The magnetic rotational position sensor of claim 13, wherein said first and second stationary pole pieces include first and second upstanding flanges, respectively, said first and second upstanding flanges being spaced said first predetermined distance apart to define said first predetermined air gap.

15. The magnetic rotational position sensor of claim 14, wherein said first and second magnets are contoured to supply a level of magnetic flux into said first predetermined air gap that compensates for non-linear magnetic effects, said magnetic flux sensor producing a linear output signal corresponding to the level of magnetic flux in said first predetermined air gap.

16. The magnetic rotational position sensor of claim 15, and further comprising a magnetic fringing shield disposed in said second predetermined air gap to compensate for non-linear magnetic effects between said first and second stationary pole pieces and said rotating pole piece.

17. The magnetic rotational position sensor of claim 8, and further comprising:

a second magnet including a second magnet pole face;

said first and second magnets having a semi-circular shape and having first and second angular spans, respectively; and wherein said rotating pole piece is flat to define a common rotating pole face, said first and second magnets being attached to said common rotating pole face with said first magnet pole face flush with said second magnet pole face, said first and second magnet pole faces situated parallel to and spaced said second predetermined distance from said first and second stationary faces to define said second predetermined air gap.

18. The magnetic rotational position sensor of claim 17, and further comprising a first stationary magnetic fringing shield disposed in said second predetermined air gap to compensate for non-linear magnetic effects between said first and second stationary pole pieces and said rotating pole piece.

19. The magnetic rotational position sensor of claim 18, wherein said first and second stationary pole pieces have third and fourth angular spans and include first and second Upstanding flanges, respectively, at adjacent ends of said third and fourth angular spans, said first and second upstanding flanges being spaced said first predetermined distance apart to define said first predetermined air gap.

20. The magnetic rotational position sensor of claim 19, and further comprising:

a second stationary magnetic fringing shield disposed in said second predetermined air gap; and wherein said first stationary magnetic fringing shield is disposed across said first predetermined air gap and said second stationary magnetic fringing shield is disposed across said first and second stationary pole pieces.

21. The magnetic rotational position sensor of claim 20, wherein:

said first angular span of said first magnet is approximately 120 degrees; and said second angular span of said second magnet is approximately 240 degrees.

22. The magnetic rotational position sensor of claim 21, wherein:

said third and fourth angular spans are each approximately 120 degrees; and said second magnetic fringing shield has an angular span of approximately 120 degrees.

23. The magnetic rotational position sensor of claim 8, and further comprising circuit means for amplifying the voltage output signal of said magnetic flux sensor.

24. The magnetic rotational position sensor of claim 8, wherein said magnetic flux sensor is a Hall effect device having a voltage output signal corresponding to the sensed level of magnetic flux.

* * * * *